(12) United States Patent
Gustafson

(10) Patent No.: US 9,469,356 B2
(45) Date of Patent: Oct. 18, 2016

(54) MULTI-AXIS REACTION ARM ASSEMBLY FOR A TRACKED TRACTOR

(71) Applicant: AGCO Corporation, Hesston, KS (US)

(72) Inventor: Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/652,021

(22) PCT Filed: Dec. 18, 2013

(86) PCT No.: PCT/US2013/076089
§ 371 (c)(1),
(2) Date: Jun. 12, 2015

(87) PCT Pub. No.: WO2014/100160
PCT Pub. Date: Jun. 26, 2014

(65) Prior Publication Data
US 2015/0307144 A1    Oct. 29, 2015

Related U.S. Application Data

(60) Provisional application No. 61/740,693, filed on Dec. 21, 2012.

(51) Int. Cl.
*B62D 55/14* (2006.01)
*B62D 55/10* (2006.01)
*B62D 55/30* (2006.01)

(52) U.S. Cl.
CPC ............... *B62D 55/10* (2013.01); *B62D 55/30* (2013.01)

(58) Field of Classification Search
CPC .......... B62M 27/02; B62M 2027/026; B62M 2027/027; B62D 55/10; B62D 55/14; B62D 55/104; B62D 55/08; B62D 55/112; B62D 55/084; B62D 55/116; B62D 55/30; B62D 55/12; B62D 55/305
USPC ................ 305/120, 124–134, 138, 143, 145; 180/184–185, 192–193
See application file for complete search history.

(56) References Cited

U.S. PATENT DOCUMENTS 3,437,163 A    4/1969    Lemmerman
4,444,409 A    4/1984    Garrison
(Continued)

OTHER PUBLICATIONS

US International Searching Authority, International Search Report for International Patent Application No. PCT/US13/76089, mailing date of Apr. 28, 2014.

*Primary Examiner* — Jason Bellinger

(57) ABSTRACT

An apparatus is disclosed for connecting a drive wheel axle and a track roller frame in a tracked vehicle. The apparatus includes an arm portion for attachment to the track roller frame; a yoke comprising a pivotal connection to the arm portion about a first pivot axis; a bearing housing comprising a pivotal connection to the yoke about a second pivot axis; a bearing assembly disposed adjacent the bearing housing; and a collet separated from the bearing housing by the bearing assembly, wherein the collet is configured for affixation to the drive wheel axle. A method is disclosed for accommodating forces in a vehicle on a drive wheel axle transmitted through a track roller frame, the method including providing an apparatus connecting the drive wheel axle and the track roller frame. The method further includes pivoting portions of the apparatus relative to each other about first and second pivot axes.

18 Claims, 7 Drawing Sheets

(56) References Cited

U.S. PATENT DOCUMENTS

| | | | | |
|---|---|---|---|---|
| 4,448,273 A | * | 5/1984 | Barbieri | B62D 55/065 180/9.21 |
| 5,018,591 A | | 5/1991 | Price | |
| 5,368,115 A | * | 11/1994 | Crabb | B62D 55/08 180/9.1 |
| 5,409,305 A | | 4/1995 | Nagorcka | |
| 5,855,421 A | * | 1/1999 | Kautsch | B62D 55/125 305/136 |
| 6,132,133 A | * | 10/2000 | Muro | E01C 19/286 180/9.46 |
| 6,273,530 B1 | * | 8/2001 | Johnson | B62D 55/305 305/116 |
| 6,283,562 B1 | * | 9/2001 | Tsubota | B62D 55/00 180/308 |
| 6,318,484 B2 | * | 11/2001 | Lykken | 180/9.1 |
| 6,543,955 B2 | | 4/2003 | Conaway et al. | |
| 2010/0301179 A1 | | 12/2010 | Brown et al. | |
| 2010/0326317 A1 | | 12/2010 | Simson | |

* cited by examiner

MULTI-AXIS REACTION ARM ASSEMBLY FOR A TRACKED TRACTOR

CROSS REFERENCE TO RELATED APPLICATIONS

This application is a national phase application of international patent application number PCT/US2013/076089, filed Dec. 18, 2013, which claims priority to U.S. provisional application Ser. No. 61/740,693, filed Dec. 21, 2012. The full disclosures, in their entireties, of international patent application number PCT/US2013/076089 and U.S. provisional application Ser. No. 61/740,693 are hereby incorporated by reference.

BACKGROUND OF THE INVENTION

1. Field of Invention

This invention relates generally to connecting a drive wheel axle and a track roller frame on a vehicle, and more particularly to accommodating forces in a drive wheel axle transmitted through a track roller frame.

2. Description of Related Art

A tractor for agricultural use can have wheels or tracks in contact with the ground surface. A cultivator is one agricultural implement that is often pulled by a tracked tractor, which has an advantage in a planted field over a wheeled tractor of having its weight more evenly distributed on the ground surface. A tracked tractor generally has two track assemblies, one on each of the left and right sides of the tractor. A track assembly typically includes a rubber track that forms a loop around a drive wheel, a number of mid-rollers, and an idler wheel. During use of the tractor, the drive wheel rotates and engages the rubber track, thereby causing the rubber track to rotate around a path defined by the drive wheel and the idler wheel. The rotation of the rubber track causes it to engage the ground, thereby propelling the tractor on the ground surface of the crop field.

A drive wheel of the tractor is rotatably attached to the drive wheel axle. Typically, the drive wheel axle has no freedom of movement other than the rotational motion provided by gears of a power train. However, in some tractor models, the track roller frame between a drive wheel and a corresponding idler wheel slightly twists and shifts from side to side in use as the tractor travels, especially over uneven terrain. Accordingly, there is a need for a structure for connecting the drive wheel axle and the track roller frame that has an ability to absorb or oppose the load caused by the positional misalignments between the drive wheel axle and the track roller frame.

OVERVIEW OF THE INVENTION

In one embodiment, the invention is directed to an apparatus for connecting a drive wheel axle and a track roller frame in a tracked vehicle. The apparatus comprises an arm portion for attachment to the track roller frame; a yoke comprising a pivotal connection to the arm portion about a first pivot axis; a bearing housing comprising a pivotal connection to the yoke about a second pivot axis; a bearing assembly disposed adjacent the bearing housing; and a collet separated from the bearing housing by the bearing assembly, wherein the collet is configured for affixation to the drive wheel axle.

In another aspect, a method is disclosed for accommodating forces in a vehicle on a drive wheel axle transmitted through a track roller frame, the method comprising providing an apparatus connecting the drive wheel axle and the track roller frame. The method further comprises pivoting a second portion of the apparatus relative to a first portion of the apparatus about a first pivot axis, wherein the first portion of the apparatus is connected to the track roller frame. Moreover, the method comprises pivoting a third portion of the apparatus relative to the second portion of the apparatus about a second pivot axis, wherein the third portion of the apparatus is connected to the drive wheel axle.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
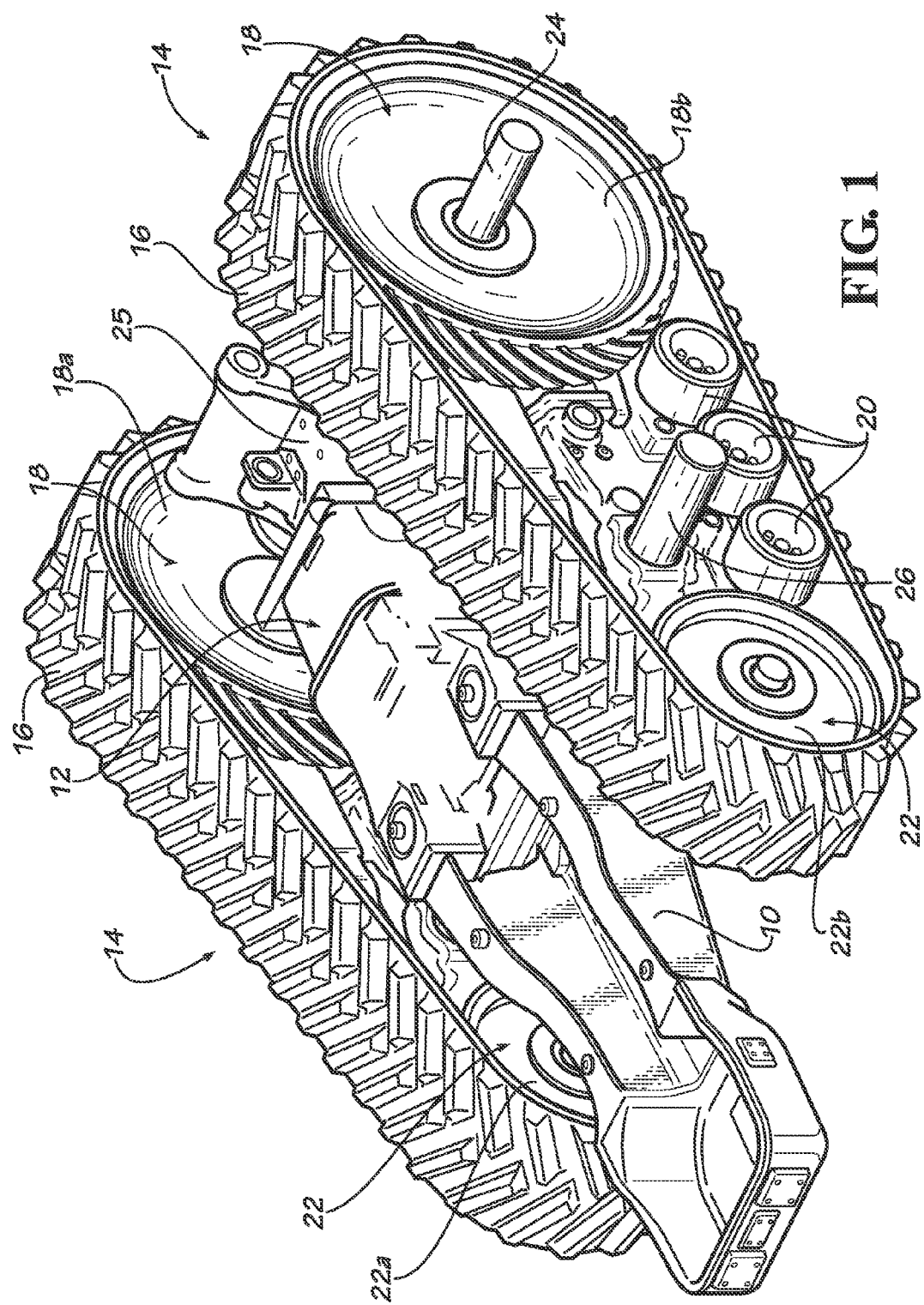
FIG. 1 is a perspective view of the front frame, power train, and track assemblies of a tracked tractor embodying an exemplary embodiment of a multi-axis reaction arm of the present disclosure.
Figure 2:
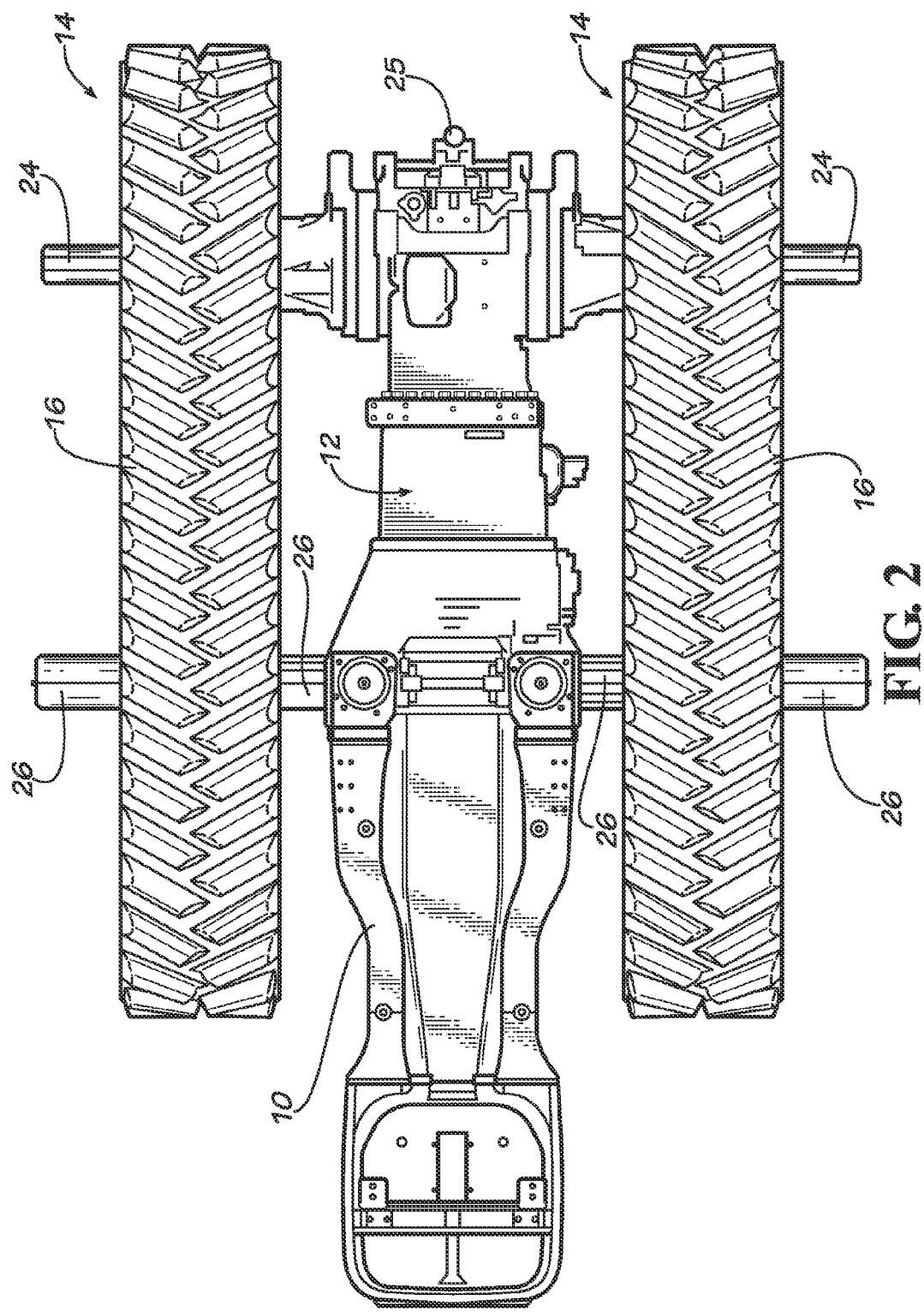
FIG. 2 is a top view of the parts of a tracked tractor of FIG. 1.

FIG. 1 is a perspective view and FIG. 2 is a top plan view of the front frame 10, power train 12, and track assemblies 14 of a tracked tractor embodying an exemplary embodiment of a multi-axis reaction arm of the present disclosure. Many of the illustrated components may be found in the commercially available Challenger MT765D tracked tractor, available from AGCO Corporation of Duluth, Ga. However, the Challenger MT765D tractor does not include a reaction arm as described in this disclosure.

The illustrated tracked tractor generally has two track assemblies 14, one on each of the left and right sides of the tractor. A track assembly 14 typically includes a rubber track 16 that forms a loop around a drive wheel 18, a number of mid-rollers 20 and an idler wheel 22. During use of the tractor, drive wheel 18 rotates and engages rubber track 16, thereby causing the rubber track 16 to rotate around a path defined by drive wheel 18 and idler wheel 22. The rotation of rubber track 16 causes it to engage the ground, thereby propelling the tractor over the ground surface.

Both drive wheels 18 of the tractor are rotatably attached to the common drive wheel axle 24 extending from a transmission casing 25 of power train 12; drive wheel axle 24 has no freedom of movement relative to transmission casing 25 other than this rotational motion. Hard bar 26 passes through both track assemblies 14 and oscillates within front frame 10, thereby providing a suspension function by allowing the undercarriage to move up and down relative to front frame 10. Each drive wheel 18 comprises an inner drive wheel 18a and an outer drive wheel 18b, with guide blocks 28 (visible in FIG. 3) of track 16 disposed between inner drive wheel 18a and an outer drive wheel 18b. Similarly, each idler wheel 22 comprises an inner idler wheel 22a and an outer idler wheel 22b, with guide blocks 28 of track 16 disposed between inner idler wheel 22a and an outer idler wheel 22b. Accordingly, guide blocks 28 prevent track 16 from sliding sideways off of the wheels 18, 22 and mid-rollers 20 of its respective track assembly 14. The inner and outer wheel configurations effectively capture guide blocks 28 between them, thereby retaining each track 16 on its respective drive wheel 18 and idler wheel 22 as the tractor moves.

Figure 3:
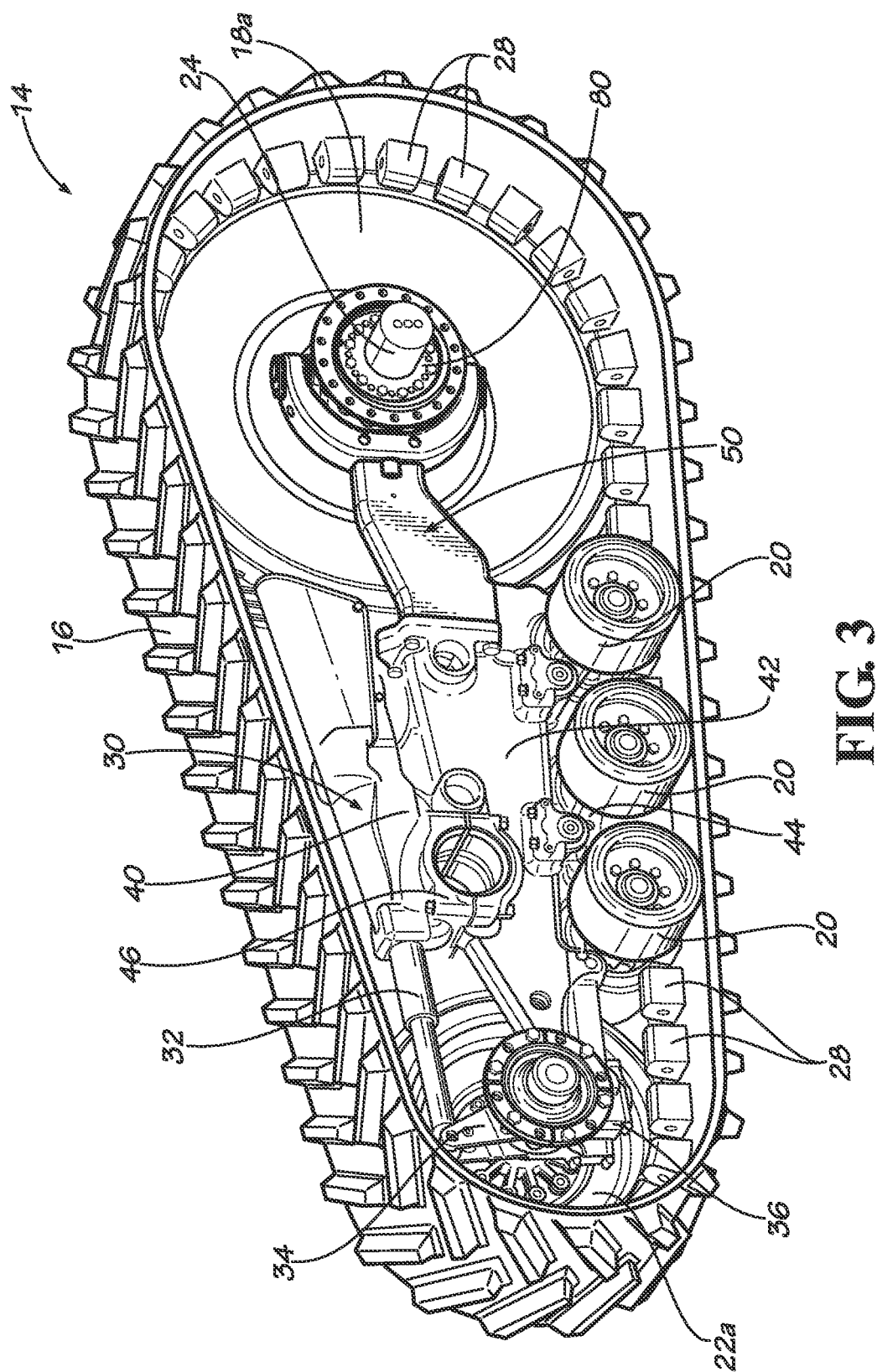
FIG. 3 is a perspective view of the left track assembly of FIG. 1, with the outer idler wheel and the outer drive wheel removed.

FIG. 3 is a perspective view of the left track assembly 14 of FIG. 1, with the outer drive wheel 18b and the outer idler wheel 22b removed. While this discussion will focus on the illustrated left track assembly 14, it is to be understood that the concepts described herein equally apply to the right track assembly 14. For proper operation, it is desirable that track 16 be tensioned tautly on its path around drive wheel 18 and idler wheel 22. In the illustrated tractor, this goal is accomplished with the use of tensioner 30. A bottom portion 40 of tensioner 30 is attached to track roller frame 42. A left side of tensioner includes hydraulic cylinder 32, which may lengthen and shorten, as known in the art. An end of cylinder 32 is pivotally connected to swing link 34, which carries front hub 36 onto which idler wheel 22 is mounted. As cylinder 32 lengthens, it moves swing link 34, which in turn moves front hub 36 forward. As a result, a distance between idler wheel 22 and drive wheel 18 increases, thereby tightening track 16 on its path around idler wheel 22 and drive wheel 18. If track 16 is too tight, cylinder 32 is shortened to decrease the distance between idler wheel 22 and drive wheel 18, thereby loosening track 16 on its path around idler wheel 22 and drive wheel 18.

Mid-rollers 20 help to support the weight of the tractor. A mid-roller 20 is connected by a pivot joint 44 to track roller frame 42. Pivot joints 44 allow mid-rollers 20 to oscillate up and down and serve a suspension function. Hard bar 26 (shown in FIGS. 1 and 2) is held by bracket 46 of track roller frame 42 and is also connected to front frame 10 (as shown in FIG. 2). Hard bar 26 passes through both track assemblies 14 and oscillates within front frame 10, thereby providing a suspension function by allowing the undercarriage to move up and down relative to front frame 10. As hard bar 26 moves, track roller frame 42 moves along with it. Thus, track roller frame 42 is allowed to slightly twist and shift from side to side in use as the tractor travels over uneven terrain. However, no oscillating or up/down movement is accommodated at drive wheel axle 24. Accordingly, a multi-axis reaction arm 50 of the present disclosure is provided between track roller frame 42 and drive wheel axle 24 to take up the load forces created by the movement of track roller frame 42 relative to drive wheel axle 24 (such load forces typically being created by the tractor traversing uneven terrain).

Figure 4:
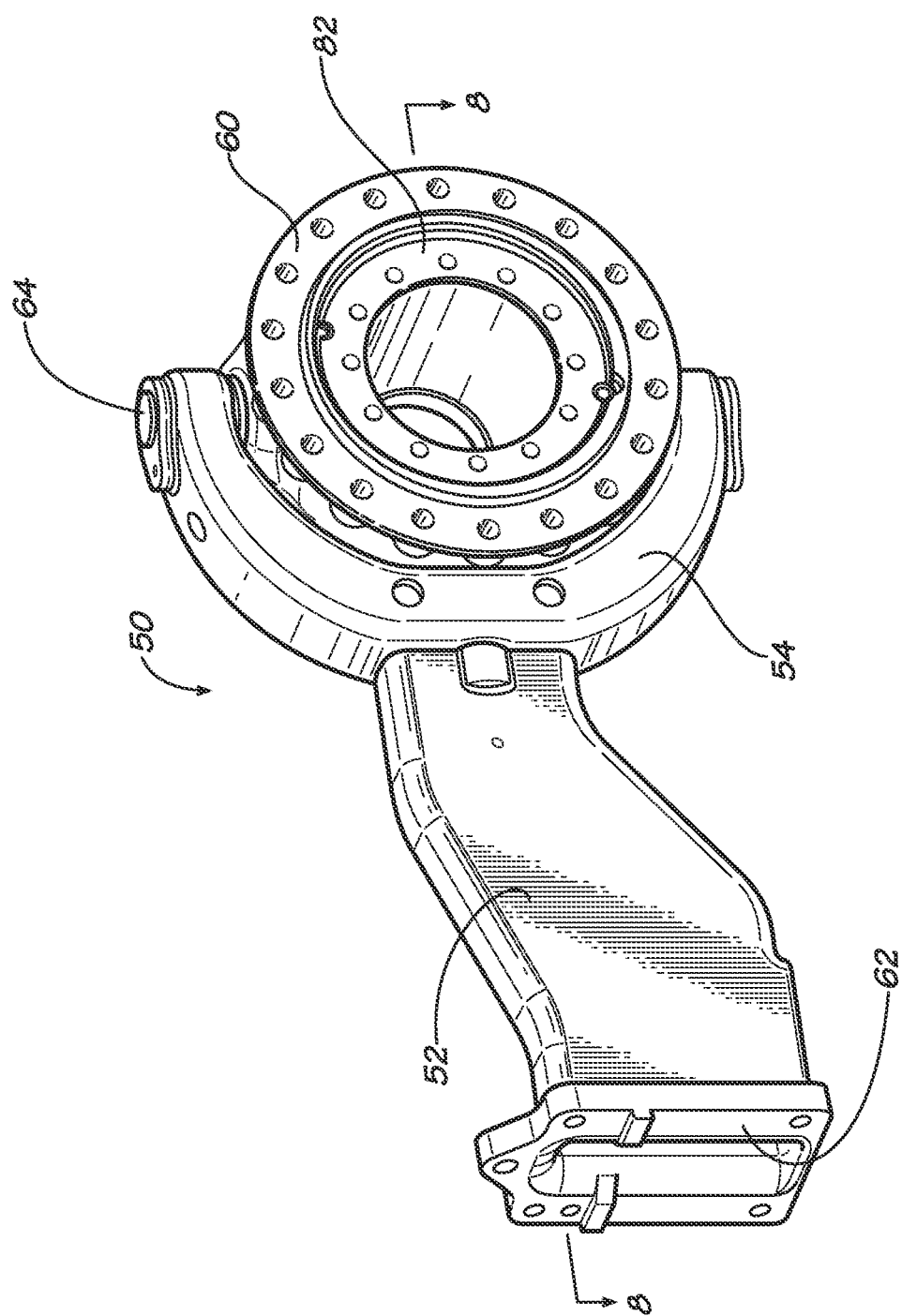
FIG. 4 is a perspective view of an exemplary embodiment of a multi-axis reaction arm of the present disclosure.
Figure 5:
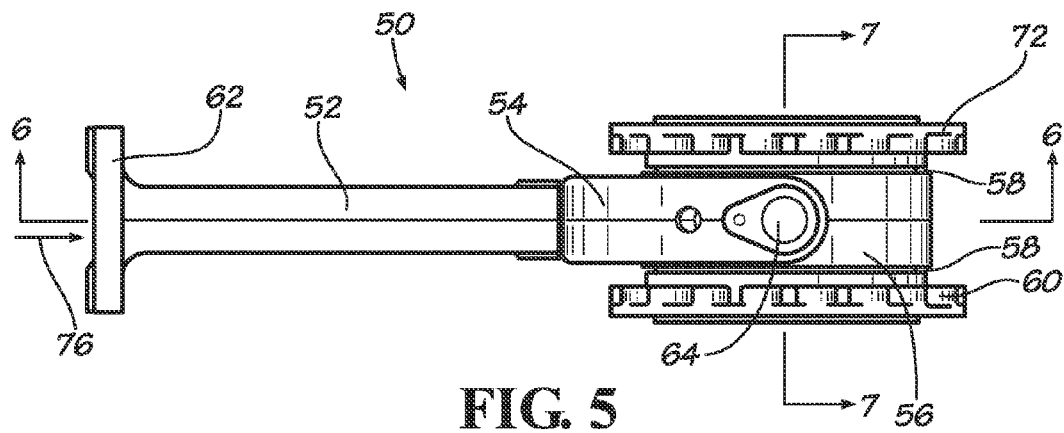
FIG. 5 is a top view of the reaction arm of FIG. 4.
Figure 6:
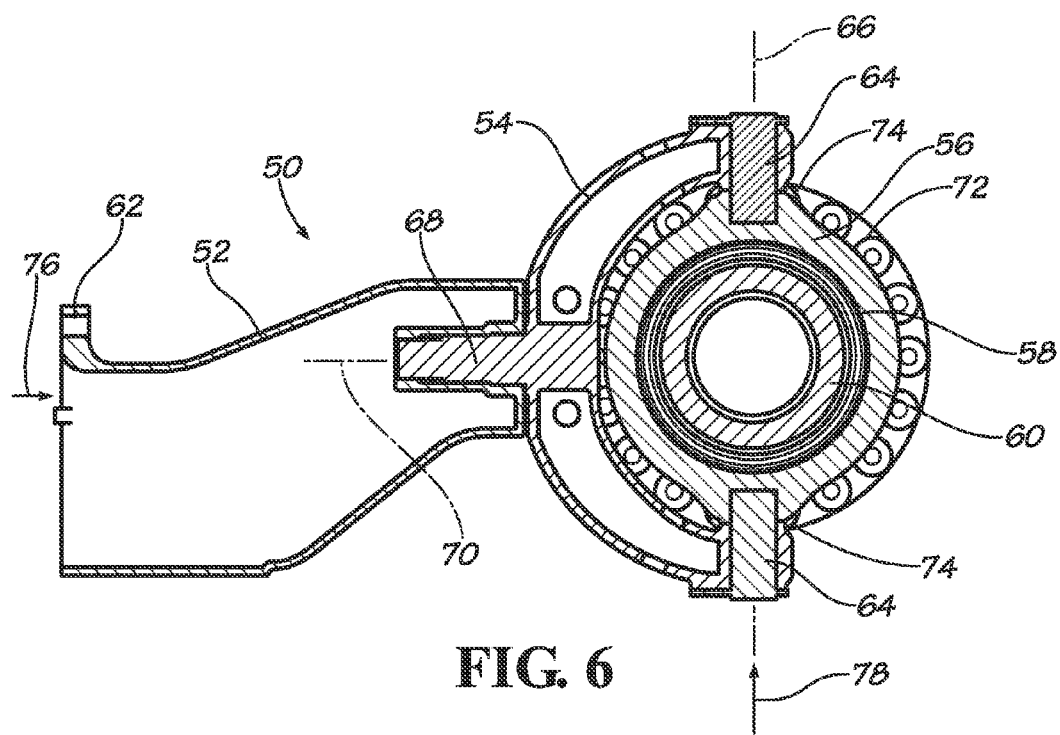
FIG. 6 is a cross-sectional view of the reaction arm of FIGS. 4 and 5, taken along the line 6-6 of FIG. 5.
Figure 7:
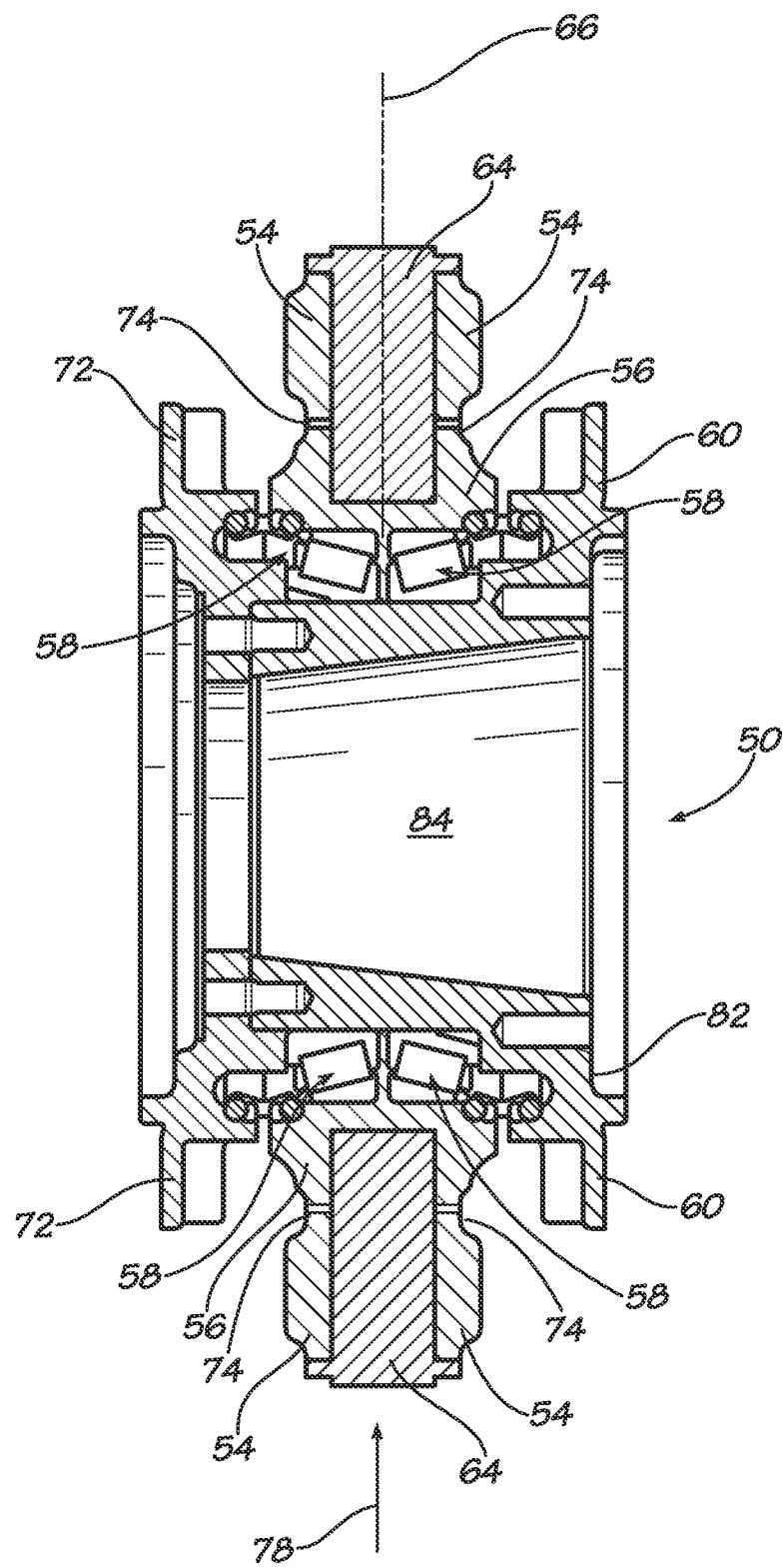
FIG. 7 is a cross-sectional view of the reaction arm of FIGS. 4-6, taken along the line 7-7 of FIG. 5.

FIG. 4 is a perspective view of an exemplary embodiment of the multi-axis reaction arm 50 of the present disclosure. FIG. 5 is a top view of reaction arm of 50. FIG. 6 is a cross-sectional view of reaction arm 50, taken along the line 6-6 of FIG. 5. FIG. 7 is a cross-sectional view of reaction arm 50, taken along the line 7-7 of FIG. 4. Reaction arm 50 comprises arm portion 52, yoke 54, bearing housing 56 (see FIGS. 5-7), bearing assembly 58, collet 60 and drive wheel hubs 72. Arm portion 52 is mounted by fasteners (not shown) via flange 62 to track roller frame 42 (such as shown in assembled form, e.g., in FIG. 3). On the opposite end of reaction arm 50, collet 60 is secured by fasteners, such as bolts, to drive wheel axle 24 (again, as illustrated, for example, in FIG. 3). Thus, collet 60 rotates with drive wheel axle 24. Inner and outer drive wheels 18a, 18b are fastened, such as by bolts, to drive wheel hubs 72 (see again, e.g., FIG. 3). In an exemplary embodiment, drive wheel hubs 72 are fixed to collet 60, such as by integral formation or by fasteners, so that drive wheel hubs 72 rotate with drive wheel axle 24. As shown in FIG. 7, bearing assembly 58 is disposed between collet 60 and bearing housing 56 to allow bearing housing 56 to remain relatively stationary even while collet 60 rotates with drive wheel axle 24. Moreover, bearing assembly 58 extends between drive wheel hubs 72 and bearing housing 56 to allow bearing housing 56 to remain relatively stationary even while drive wheel hubs 72 rotate with drive wheel axle 24. In an exemplary embodiment, bearing assembly 58 comprises a plurality of roller bearings 59.

Referring to FIGS. 6 and 7, bearing housing 56 is connected by pins 64 to yoke 54 in a manner that allows bearing housing 56 to pivot about pivot axis 66, which is substantially vertical when the tractor is disposed upright on a substantially horizontal ground surface. In an exemplary embodiment, pivot axis 66 corresponds to a longitudinal axis of pins 64. Thrust washers 74 are disposed between bearing housing 56 and yoke 54 and around pins 64. Thrust washers 74 are used to control vertical axial forces from the tractor's weight. A thrust washer is a type of bearing that provides a bearing surface for forces acting axial to the corresponding pin 64. Yoke 54 is connected by shaft 68 to arm portion 52 in a manner that allows yoke 54 to pivot about pivot axis 70, which is substantially horizontal when the tractor is disposed upright on a substantially horizontal ground surface. In an exemplary embodiment, pivot axis 70 corresponds to a longitudinal axis of shaft 68. In an exemplary embodiment, the two pivot axes 66, 70 are substantially orthogonal to each other.

Figure 8:
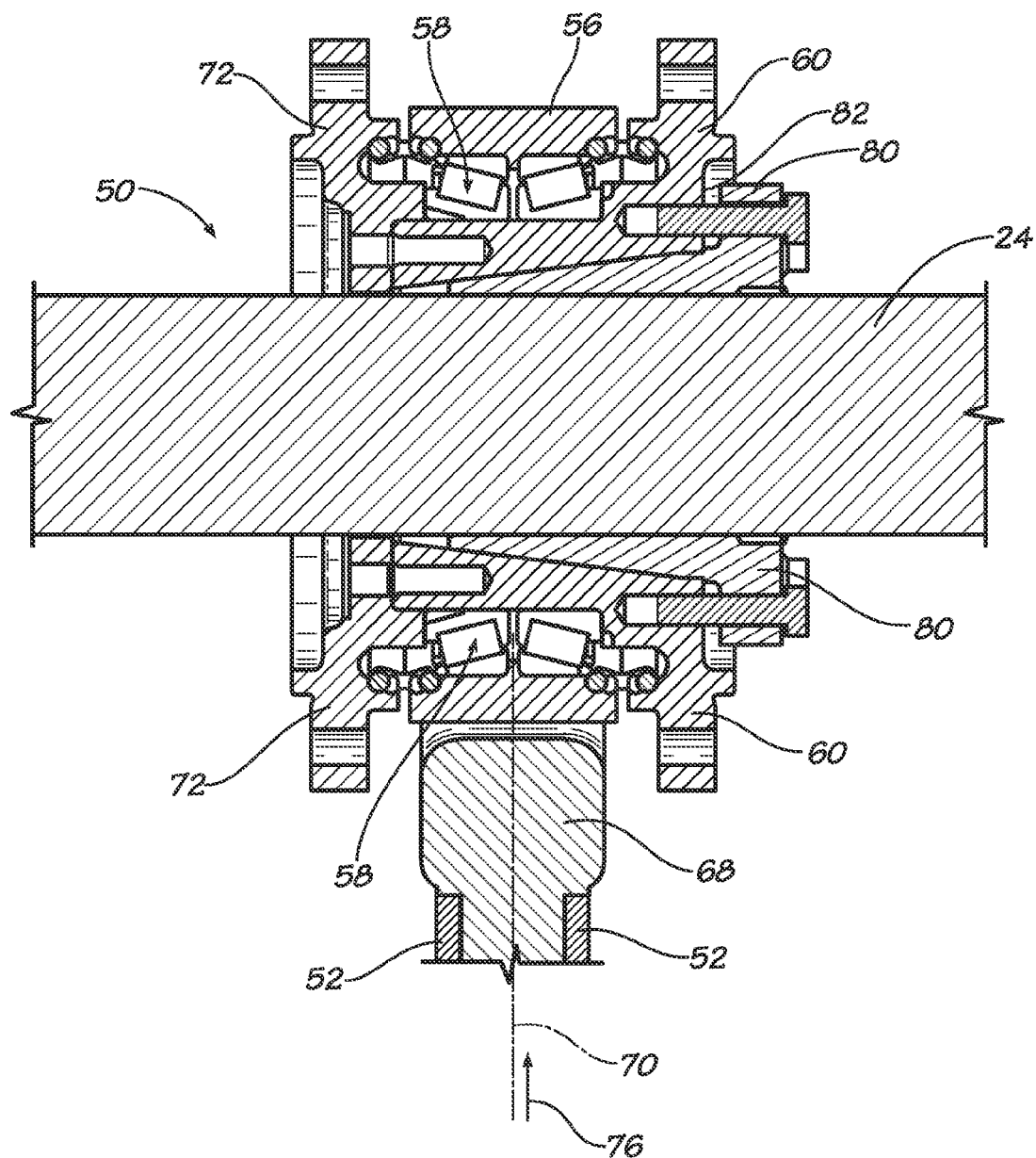
FIG. 8 is a cross-sectional view of the reaction arm of FIGS. 4-6, taken along the line 8-8 of FIG. 4.

Thus, the present disclosure describes a multi-axis reaction arm 50 that is able to resolve both the horizontal force from the track tension (the direction of which is illustrated by arrow 76 in FIGS. 5, 6 and 8) and the vertical force from the weight of the tractor (the direction of which is illustrated by arrow 78 in FIGS. 6 and 7). This is accomplished by attaching drive wheel hubs 72 and drive wheel axle 24 to track roller frame 42 in a manner that allows track roller frame 42 to pivot about both horizontal pivot axis 70 and vertical pivot axis 66. Thus, all twisting and side-to-side motions of track roller frame 42 relative to drive wheel hubs 72 and drive wheel axle 24 are accommodated by the two degrees of freedom provided by multi-axis reaction arm 50.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. An apparatus for connecting a drive wheel axle and a track roller frame in a tracked vehicle, the apparatus comprising:
   an arm portion for attachment to the track roller frame;
   a yoke comprising a pivotal connection to the arm portion about a first pivot axis;
   a bearing housing comprising a pivotal connection to the yoke about a second pivot axis;
   a bearing assembly disposed adjacent the bearing housing; and
   a collet separated from the bearing housing by the bearing assembly, wherein the collet is fixed to the drive wheel axle.

2. The apparatus of claim 1 wherein the arm portion further comprises a flange for attachment to the track roller frame.

3. The apparatus of claim 1 wherein the first pivot axis and the second pivot axis are substantially orthogonal to each other.

4. The apparatus of claim 1 wherein the first pivot axis is substantially horizontal when the tracked vehicle is disposed upright on a substantially horizontal ground surface.

5. The apparatus of claim 1 wherein the second pivot axis is substantially vertical when the tracked vehicle is disposed upright on a substantially horizontal ground surface.

6. The apparatus of claim 1 further comprising a drive wheel hub fixed to the collet.

7. The apparatus of claim 1 wherein the bearing assembly comprises a plurality of roller bearings.

8. The apparatus of claim 1 further comprising a thrust washer disposed between the yoke and the bearing housing.

9. The apparatus of claim 1 wherein the first pivot axis is a longitudinal axis of a shaft that connects the yoke to the arm portion.

10. The apparatus of claim 1 wherein the second pivot axis is a longitudinal axis of a pin that connects the bearing housing to the yoke.

11. A method for accommodating forces in a vehicle on a drive wheel axle transmitted through a track roller frame, the method comprising providing an apparatus connecting the drive wheel axle and the track roller frame, the method further comprising:
   pivoting a second portion of the apparatus relative to a first portion of the apparatus about a first pivot axis, wherein the first portion of the apparatus is connected to the track roller frame; and
   pivoting a third portion of the apparatus relative to the second portion of the apparatus about a second pivot axis, wherein the third portion of the apparatus is connected to the drive wheel axle.

12. The method of claim 11 wherein the apparatus is a reaction arm and wherein the first portion of the apparatus is an arm portion.

13. The method of claim 11 wherein the apparatus is a reaction arm and wherein the second portion of the apparatus is a yoke.

14. The method of claim 11 wherein the apparatus is a reaction arm and wherein the third portion of the apparatus is a collet.

15. The method of claim 11 wherein the first pivot axis and the second pivot axis are substantially orthogonal to each other.

16. The method of claim 11 wherein the first pivot axis is substantially horizontal when the vehicle is disposed upright on a substantially horizontal ground surface.

17. The method of claim 11 wherein the second pivot axis is substantially vertical when the vehicle is disposed upright on a substantially horizontal ground surface.

18. The method of claim 11 further comprising providing a bearing assembly between the second portion of the apparatus and the third portion of the apparatus.

* * * * *